United States Patent
Tourunen (12)

(10) Patent No.: US 6,810,216 B1
(45) Date of Patent: Oct. 26, 2004

(54) FAST INFRARED TRANSCEIVER WITH REDUCED POWER CONSUMPTION

(75) Inventor: Ari Tourunen, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/347,320

(22) Filed: Jul. 2, 1999

(51) Int. Cl.$^7$ .............................................. H04B 10/00
(52) U.S. Cl. ........................ 398/202; 330/51; 398/135; 398/138; 455/343; 455/574
(58) Field of Search ................ 359/152, 154, 359/168; 375/239, 377, 9, 45; 455/78, 343, 574; 330/51; 398/128, 130, 135, 138, 202

(56) References Cited

U.S. PATENT DOCUMENTS

| | | | | |
|---|---|---|---|---|
| 5,222,076 A | * | 6/1993 | Ng et al. ....................... | 375/9 |
| 5,418,490 A | * | 5/1995 | Kaegebein ................... | 330/51 |
| 5,440,595 A | * | 8/1995 | Nagasaki .................... | 375/377 |
| 5,528,233 A | * | 6/1996 | Hansell ................. | 340/870.28 |
| 5,661,434 A | * | 8/1997 | Brozovich et al. ............ | 330/51 |
| 5,812,930 A | * | 9/1998 | Zavrel ........................ | 455/5.1 |
| 6,091,530 A | * | 7/2000 | Duckworth .................. | 359/172 |
| 6,292,233 B1 | * | 9/2001 | Erba et al. ................... | 348/730 |
| 6,333,801 B1 | * | 12/2001 | Yoshinaga .................. | 359/152 |

* cited by examiner

*Primary Examiner*—Brent A. Swarthout
(74) *Attorney, Agent, or Firm*—Wayne M. DeMello

(57) ABSTRACT

A circuit and method to decrease power consumption of fast infrared links. Reduced power consumption allows continuous infrared standby in battery-powered (and other power-consumption sensitive) devices. A low speed, low power-consumption infrared receiver preamplifier is used in conjunction with a higher speed, higher power-consumption infrared receiver preamplifier. While the battery-powered device awaits an infrared transmission, the low power-consumption receiver preamplifier operates in standby mode and the high power-consumption receiver preamplifier is in shutdown mode. Because the higher power consumption receiver preamplifier is in shutdown mode, standby power consumption is reduced and time between battery recharging is increased. When the low power receiver preamplifier detects an infrared transmission, the high power receiver preamplifier can be activated if high-speed communication is needed. An alternative discloses dual receivers rather than dual preamplifiers in one receiver.

24 Claims, 4 Drawing Sheets

| | POSSIBLE MODES | | |
|---|---|---|---|
| PREAMPLIFIER 210 | RECEIVE | STANDBY | SHUTDOWN |
| PREAMPLIFIER 220 | SHUTDOWN | RECEIVE, STANDBY, OR SHUTDOWN | RECEIVE, STANDBY, OR SHUTDOWN |

FAST INFRARED TRANSCEIVER WITH REDUCED POWER CONSUMPTION

FIELD OF THE INVENTION

This invention relates to infrared communications and, more particularly, to fast infrared transceivers having low standby power consumption.

BACKGROUND OF THE INVENTION

Electronic devices such as portable computers, electronic organizers, personal digital assistants, and cellular telephones, use infrared communications. The devices typically adhere to one of the Infrared Data Association (IrDA) infrared communication standards. The IrDA standards are based on the OSI seven-layer model. Presently, there are two generations of standards in the IrDA family: the 1.0 generation and the 1.1 generation. IrDA 1.0 sets a maximum data rate (aka signaling rate) of 115,000 bits per second (115 kbps) over a communications link. IrDA 1.1 sets a maximum data rate of 4,000,000 bits per second (4 Mbps) over the communications link. When using current technology, data rates over 200 kbps can be considered high-speed.

An infrared communications link usually incorporates a combination infrared transmitter and receiver, known as a transceiver. The transceiver transmits a modulated infrared signal and receives modulated infrared signals. An IR transceiver always operates in one of four modes: shutdown, standby, receive, or transmit.

In shutdown mode, the transceiver consumes almost no power. It is not capable of receiving or transmitting while in shutdown mode. Thus the transceiver cannot detect when another device attempts to establish an infrared communication link. The user generally must manually "wakeup" the transceiver from shutdown mode.

In standby mode, the transceiver consumes more power than when in shutdown mode but less than when in transmit or receive mode. The transceiver may detect infrared transmissions when in standby mode but may not receive or transmit. This ability to detect infrared transmissions is an important functional difference between standby mode and shutdown mode.

The "active" modes of a transceiver are receive mode and transmit mode. During reception, the transceiver operates in receive mode. During transmission it operates in transmit mode. Active modes consume more power than standby or shutdown modes.

High power consumption in transceivers for fast infrared links (for example the 4 Mbps IrDA 1.1 implementation) is at least partially due to the power required by the receiver stage. High-speed receivers generally consume more power than low-speed receivers do, even when operated in standby or shutdown mode. In active mode, a 4 Mbps capable receiver consumes more power than the slower 115 kbps receiver, regardless of the speed at which the 4 Mbps receiver is actually receiving data. In other words, even if both are operated at 115 kbps, a 4 Mbps receiver consumes much more power than a 115 kbps receiver.

Additional general background, which helps to show the knowledge of those skilled in the art regarding the system context, and of variations and options for implementations, may be found in the following from the IrDA 1.0 and 1.1 families of standards: IrDA Serial Infrared Physical Layer Link Specification; IrDA Serial Infrared Link Access Protocol (IrLAP); IrDA Serial Infrared Link Management Protocol (IrLMP); IrDA Tiny TP; IrDA Command and Control Ir Standard (formerly known as IrBus); IrDA Infrared Communications Protocol 1.0; IrDA Infrared Tiny Transport Protocol 1.1; IrDA Infrared LAN Access Extensions for Link Management Protocol 1.0; IrDA Object Exchange Protocol 1.2; IrDA Minimal IrDA Protocol Implementation; IrDA Plug and Play Extensions; IrDA Infrared Mobile Communications; and IrDA Infrared Transfer Picture Specifications; all of which are hereby incorporated by reference. IrDA standards and protocols are available over the internet from the Infrared Data Association at www.irda.org.

SUMMARY OF THE INVENTION

Disclosed is a circuit and method to dramatically reduce power consumption of fast infrared links without putting the link in shutdown mode. A low speed, low power-consumption infrared receiver preamplifier is used in conjunction with a higher speed, higher power-consumption infrared receiver preamplifier. While waiting for an IR link to be initiated, the low-power preamplifier operates in standby mode and the high-power preamplifier is shutdown to reduce power consumption. When the low power receiver preamplifier detects an infrared transmission, the high power receiver preamplifier can be activated if high-speed communication is needed. Unlike power-saving schemes that put the link in shutdown mode, infrared communications are continuously available by use of the disclosed innovations. Thus a user does not have to manually "wake up" the infrared receiver to receive a message.

At the system level in a disclosed embodiment, a communications link between two devices using IrDA standards is initiated with a simple 9.6 kbps modulation. After the communications link is initiated at 9.6 kbps, a communication speed for further communication over the link is negotiated between the two devices. Bit rate negotiations and link control are discussed in IrDA Serial Infrared Link Access Protocol.

A 115 kbps transceiver can receive and transmit the necessary 9.6 kbps modulation required to negotiate a communications link. Therefore, every time two IrDA systems (including the faster 4 Mbps IrDA 1.1 devices) establish a connection, they could initiate the connection with a low power 115 kbps receiver rather than a higher power consumption 4 Mbps receiver.

Disclosed is a transceiver with a single receiver having two preamplifiers. A low power consumption, low-speed infrared receiver preamplifier stage is used in combination with a higher power consumption, higher speed infrared receiver preamplifier stage. The higher speed preamplifier can be put in shutdown mode to conserve power while the lower power consumption preamplifier remains in standby. This allows a high-speed transceiver to remain in continuous standby while awaiting an infrared message, yet limit power consumption while waiting. In the presently preferred embodiment, a 115 kbps preamplifer is used in combination with a 4 Mbps preamplifier. In an alternate embodiment, dual receivers could be used instead of dual preamplifiers in one receiver. In other words the transceiver could have two receivers, perhaps one that operates at 115 kbps and one that operates at 4 Mbps. In another embodiment, the receiver(s) and transmitter could be physically separate, not together in a transceiver.

While waiting for a communication link to be initiated, the low power preamplifier stage is in standby and the fast preamplifier is in shutdown. After a high-speed connection is established, an IrDA-compliant controller switches the transceiver from the 115 kbps preamplifier stage to the 4 Mbps preamplifier stage. Compared to prior art 4 Mbps infrared transceivers, the innovative infrared transceiver consumes very little power when in standby mode because the fast preamplifier (which consumes the more power than the slower preamplifier) is in shutdown mode when it is not needed for communication.

The method and circuit allow a continuous infrared standby because power consumption is dramatically reduced. Low power consumption preamplifiers generally are considered to be those that have a standby current of less than 3 mA. For example, standby current in the presently preferred embodiment is reduced from over 3 mA to under 100 $\mu$A at a supply voltage of 2.7V. Thus continuous infrared standby is now a viable option for battery powered devices that incorporate the disclosed innovations for fast infrared communications.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.
Definitions:

Passive Mode: Shutdown or standby mode.
Active Mode: Receive or transmit mode.

Figure 1:
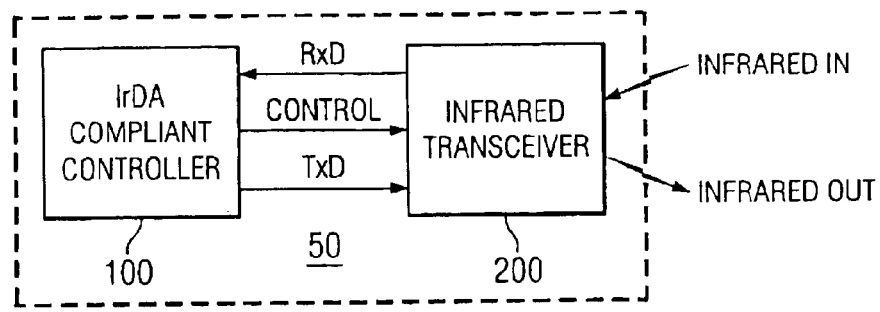
FIG. 1 depicts an electronic device having an IrDA compliant controller and an IR transceiver.

FIG. 1 is a block diagram of an electronic device 50 that uses an IrDA compliant controller 100 and an IR transceiver 200 for infrared communications. Through the transceiver 200, the IrDA compliant controller 100 negotiates with a remote device to establish an IR communication link. When an IR signal from the remote device is received at IR transceiver 200, it is passed via RxD to the controller 100. The controller 100 may process the received signal or pass it on to an electronic device 50. The controller 100 sends control signals via control line CONTROL to a control logic block (shown in FIGS. 2 and 3) in the transceiver 200. Data to be transmitted passes from the controller 100 to the transceiver 200 along TxD (the transmit data line).

Power consumption in fast infrared links (for example the 4 Mbps IrDA 1.1 implementation) is affected by the power required by the receiver stage, particularly the receiver preamplifier. Generally, the higher the speed for which the preamplifier is designed, the greater its power consumption. A receiver preamplifier designed to operate at 4 Mbps consumes more power than a receiver preamplifier designed to operate at 115 kbps, regardless of the speed at which the 4 Mbps preamplifier is actually operating. In other words, even if both are operated at 115 kbps, a preamplifier designed for 4 Mbps operation consumes much more power than one designed for 115 kbps operation.

Figure 2:
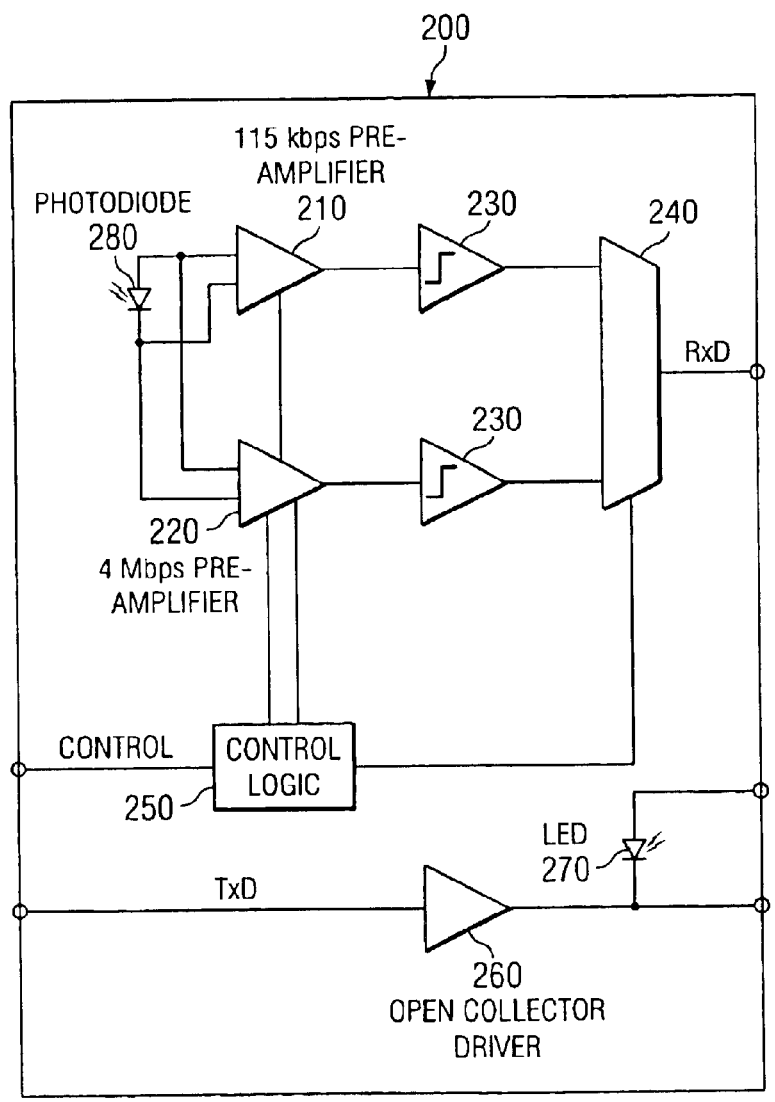
FIG. 2 depicts an IR transceiver circuit with two receiver preamplifiers and dual comparators.

Referring to FIG. 2, the transceiver 200 is shown in an embodiment having two receiver preamplifiers and two comparators. To save power while waiting for an IR communication, control logic 250 initially holds a low-speed preamplifier 210 in standby mode and high-speed preamplifier 220 in shutdown mode. When an IR signal is received at a photodiode 280, the low-speed preamplifier 210 wakes from standby to active mode and amplifies the received IR signal. A comparator 230 converts the amplified signal to an appropriate digital output level. Control logic 250 selects the appropriate input to a multiplexer (MUX) 240 depending on which receiver preamplifier (210 or 220) is active. When initially negotiating a communications link, control logic 250 is set to select the low-speed preamplifier input to MUX 240. The digital signal then passes through the MUX 240 and RxD (the received data line) to an IrDA compliant controller 100 (shown in FIG. 1).

In response to the received signal, controller 100 (shown in FIG. 1) will negotiate a communications link with the signal's sender. During this negotiation, the controller 100 will transmit data along TxD, through the transmitter stage of the transceiver. The transceiver stage typically consists of an open collector driver 260 and an IR LED 270. If a high-speed link is negotiated, the controller 100 signals the control logic 250 to wake the high-speed receiver preamplifier 220 from shutdown mode to standby or active mode and to put low-speed receiver preamplifier 210 in shutdown or standby mode.

Figures 3, 4:
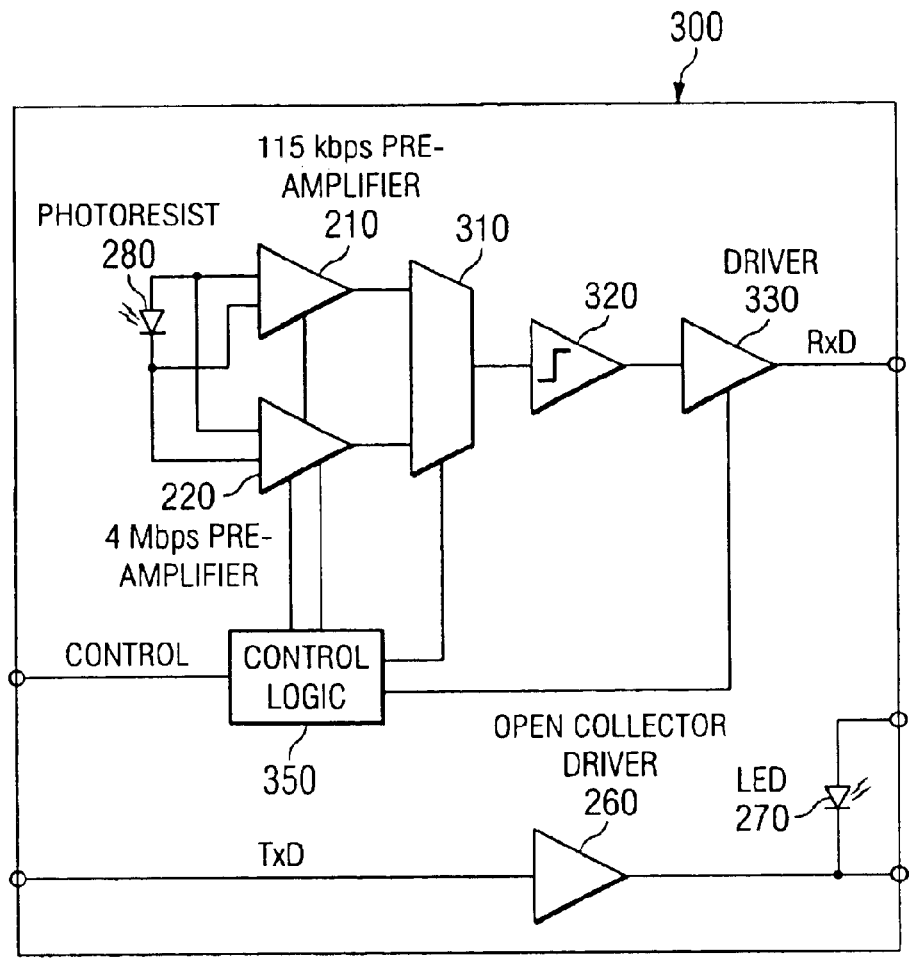
FIG. 3 depicts an IR transceiver circuit with two receiver preamplifiers and a single comparator.
FIG. 4 shows a table of possible mode relationships between the two receiver preamplifiers of FIGS. 2 and 3.

Referring to FIG. 3, the transceiver 300 is shown in an embodiment having two receiver preamplifiers and a single comparator. The operation of the transceiver 300 shown in FIG. 3 is much like that of the transceiver 200 shown in FIG. 2. The main difference between the two transceivers (200 and 300) is in the arrangement of comparator and multiplexer. Using a single comparator 320 that is placed after multiplexer 310 instead of before the multiplexer, as in transceiver 200, reduces circuit complexity. This reduced complexity allows an optional driver 330 to be included in the receiver circuitry of transceiver 300. In alternate embodiments, instead of being a separate circuit element, driver 330 could be implemented within the circuitry of MUX 240 or comparator 320. In the embodiment shown, control logic 250 supplies an optional control signal to a driver 330, placing the driver 330 in a reduced power mode for increased power savings.

At any given time, receiver preamplifiers 210 and 220 may be in receive, standby, or shutdown mode. FIG. 4 shows a table of the relationships possible in the disclosed embodiments. When low-speed preamplifier 210 is in receive mode, high-speed preamplifier 220 must be in shutdown mode. When low-speed preamplifier 210 is in standby or shutdown mode, high-speed preamplifier 220 may be in any of its three possible modes (shutdown, standby, or receive). A transceiver can reduce power consumption by putting high-speed preamplifier 220 in shutdown mode when low-speed preamplifier 210 is waiting in standby for a remote device to initiate communications. As shown in FIG. 4, the relative modes of the two preamplifiers (210 and 220) depend upon whether a particular embodiment of the invention has the capability to put low-speed preamplifier 210 in shutdown mode. In an embodiment of the invention that does not allow low-speed receiver preamplifier 210 to be put in shutdown mode, low-speed preamplifier 210 will be in standby mode when high-speed preamplifier 220 is receiving or in standby. In the embodiments disclosed, high-speed preamplifier 220 will only enter standby mode if a high-speed link has been established and its associated transceiver is transmitting or waiting to receive data. In an embodiment that does allow low-speed preamplifier 210 to be put in shutdown mode, low-speed preamplifier 210 will be in shutdown mode when high-speed preamplifier 220 is in receive mode or standby mode (which occurs if a high-speed link has been established). Optionally, low-speed preamplifier 210 and high-speed preamplifier 220 may be put in shutdown mode at the same time for increased power savings if the embodiment is one that allows low-speed preamplifier 210 to be put in shutdown mode.

Figure 5:
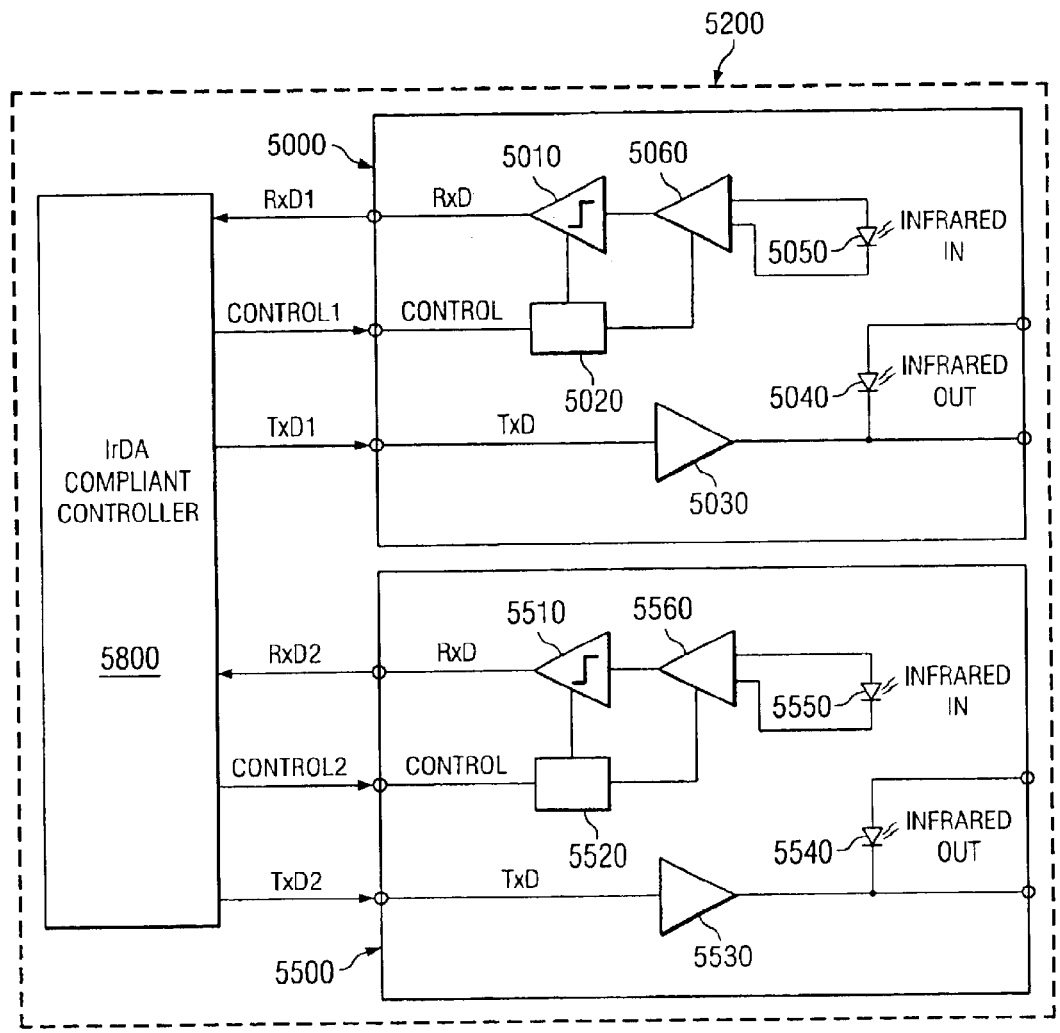
FIG. 5 depicts a dual transceiver embodiment.

FIG. 5 shows an alternate embodiment of the disclosed innovations. This embodiment mainly differs from the embodiment disclosed in FIG. 2 in that two transceivers are used, rather than one transceiver having two preamplifiers. An electronic device 5200 contains an IrDA compliant controller 5800, a low power consumption transceiver 5000, and a higher power consumption transceiver 5500. When waiting for an IR link to be initiated, the controller 5800 places transceiver 5000 in standby and transceiver 5500 in shutdown via control signals communicated to control logic 5020 and 5520, over control lines CTRL1 and CTRL2 respectively. IR signals are detected by photodiode 5050 and amplified by preamplifier 5060. The detected signal then passes through the comparator 5010 to the controller 5800. Note that, unlike the transceivers of FIGS. 2 and 3, a MUX is not required in the transceiver. When negotiating a communication link, controller 5800 will transmit data over line TxD1 through open collector driver 5030 and LED 5040. If a high-speed link is negotiated, controller 5800 will send a "wake" signal to control logic 5520 and transceiver 5500 will "wake" from shutdown mode. High-speed communications will take place through photodiode 5550, preamplifier 5560, comparator 5510, open collector driver 5530, and LED 5540 in the essentially the same way that they occur through the low speed transceiver 5000.

Figure 6:
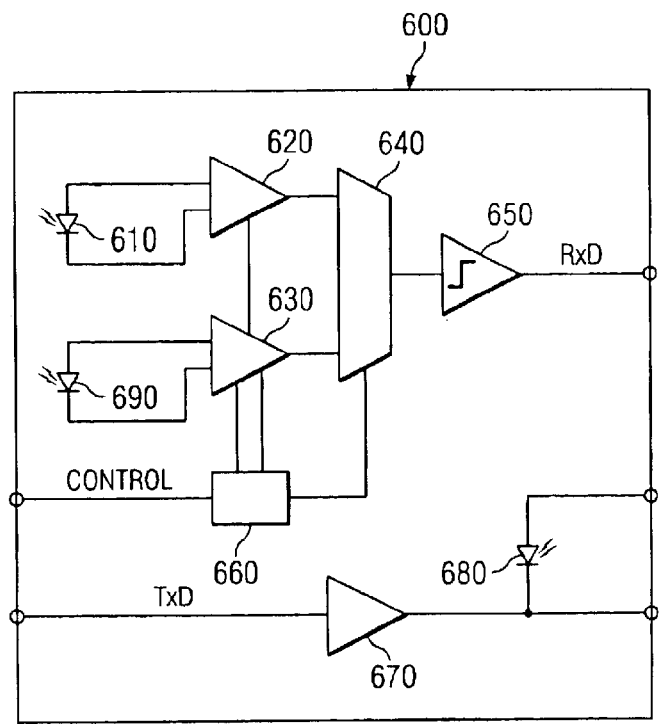
FIG. 6 depicts a dual photodiode embodiment.

FIG. 6 shows an alternate embodiment of the disclosed innovations having two photodiodes (610 and 690) instead of one photodiode as shown in the embodiment of FIG. 3. Low-speed preamplifier 620 receives IR signals through photodiode 610 and high-speed preamplifier 630 receives IR signals through photodiode 690. In response to control signals from an external controller, control logic 660 can change the modes of the preamplifiers (620 and 630) and select the appropriate input to MUX 640. The output of MUX 640 then passes through comparator 650. Transceiver 600 transmits data through open-collector driver 670 and LED 680.

Figure 7:
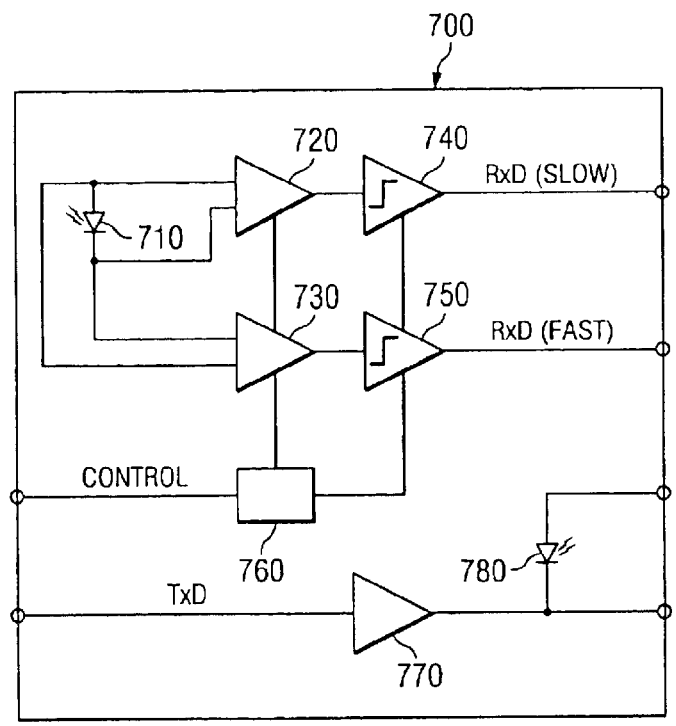
FIG. 7 depicts a dual receiver embodiment.

FIG. 7 shows an alternate embodiment of the disclosed innovations having a transceiver with two separate receivers (one slow, the other faster). The slow receiver has low speed, low power consumption preamplifier 720 and comparator 740. The fast receiver has fast, high power consumption preamplifier 730 and comparator 750. Both receivers share photodiode 710 in this embodiment. While waiting for a communications link to be initiated, control logic 760 holds preamplifier 720 in standby mode and preamplifier 730 in shutdown mode. If a high-speed link is negotiated, control logic 760 will wake fast preamplifier 730 in response to control signals from a controller external to transceiver 700. Data is transmitted through open-collector driver 770 and LED 780.

FIGS. 2, 3, and 5–7 show block diagrams of transceivers 200, 300, 5000, 5500, 600, and 700. These block diagrams show the transceivers as a packaged integrated circuit (having pins such as RxD, TxD, etc.). However, each of these transceivers may be manufactured as an integrated circuit or from discrete components.

As will be recognized by those skilled in the art, the innovative concepts described in the present application can be modified and varied over a tremendous range of applications, and accordingly the scope of patented subject matter is not limited by any of the specific exemplary teachings given.

For example, if additional power savings are needed, the ability to put the link in shutdown mode could be retained. This could be accomplished by optionally deactivating (putting in shutdown) the 115 Kpbs receiver stage in addition to deactivating the 4 Mbps receiver stage.

For example, there are many possible arrangements of receiver components that can be used with the disclosed innovations. Although FIGS. 2, 3, and 5–7 show several such arrangements, other electrical arrangements of the multiplexers, comparators, and photodiodes are possible. In fact, components such as the multiplexers or comparators may be excluded entirely in some designs.

For example, there are many electronic circuit components that are freely substitutable for some of the components shown in FIGS. 2, 3, and 5–7. Any suitable IR detector may be substituted for photodiodes. Any suitable components such as an analog-to-digital (A/D) converter may be substituted for the comparators shown. The invention is not restricted to controlling the mode of preamplifiers. Any suitable receiver components may be substituted for the preamplifiers shown.

For example, although IrDA standards are discussed, the inventions disclosed may be practiced without adherence to the IrDA standards. The benefits of the inventions may be had without adherence to any standards or to standards other than the IrDA standards.

What is claimed is:

1. An infrared receiver, comprising:
   a first receiver preamplifier;
   a second receiver preamplifier; and
   control logic electrically connected to said first receiver preamplifier and said second receiver preamplifier,
   wherein said control logic configured to put said second receiver preamplifier in shutdown mode when said first receiver preamplifier is in receive mode; and
   wherein said control logic is further configured to put said first receiver preamplifier in shutdown mode when said second receiver preamplifier is in receive mode.

2. The infrared receiver of claim 1, wherein said first receiver preamplifier is a low-speed preamplifier.

3. The infrared receiver of claim 1, wherein said second receiver preamplifier is a high-speed preamplifier.

4. An infrared receiver comprising:
   a first receiver preamplifier;
   a second receiver preamplifier; and
   control logic electrically connected to said first receiver preamplifier and said second receiver preamplifier,
   wherein said control logic configured to put said second receiver preamplifier in shutdown mode when said first receiver preamplifier is in standby mode; and wherein said control logic is further configured to put said first receiver preamplifier in shutdown mode when said second receiver preamplifier is in receive mode.

5. The infrared receiver of claim 4, wherein said first receiver preamplifier consumes less than 3 milliamperes in standbys mode.

6. An infrared receiver, comprising:
a first receiver preamplifier;
a second receiver preamplifier, wherein said second receiver preamplifier consumes at least twice as much power in standby mode as said first receiver preamplifier consumes in standby mode; and control logic electrically connected to said first receiver preamplifier and said second receiver preamplifier said control logic configured to put said second receiver preamplifier in shutdown mode when said first receiver preamplifier is in receive mode.

7. An infrared receiver, comprising:
a first receiver preamplifier;
a second receiver preamplifer, wherein said second receiver preamplifier can operate at a signaling rate at least double the maximum signaling rate of said first receiver preamplifier; and
control logic electrically connected to said first receiver preamplifier and said second receiver preamplifier, said control logic configured to put said second receiver preamplifier in shutdown mode when said first receiver preamplifier is in receive mode.

8. A portable electronic device capable of infrared communication, comprising:
a portable electronic device; and
an infrared receiver electrically connected to said portable electronic device, said infrared receiver further comprising:
a first receiver preamplifier;
a second receiver preamplifier; and
control logic electrically connected to said first receiver preamplifier and said second receiver preamplifier,
wherein said control logic configured to put said second receiver preamplifier in shutdown mode when said fist receiver preamplifier is in receive mode; and
wherein said control logic is further configured to put said first receiver preamplifier in shutdown mode when said second receiver preamplifier is in receive mode.

9. The portable electronic device of claim 8, wherein said infrared receiver is disposed within a transceiver.

10. The portable electronic device of claim 8, wherein said first receiver preamplifier is a low-power consumption receiver preamplifier.

11. The portable electronic device of claim 8, wherein said first receiver preamplifier is a low-speed preamplifier.

12. The portable electronic device of claim 8, wherein said second receiver preamplifier is a high-speed preamplifier.

13. The portable electronic device of claim 8, wherein said first receiver preamplifier consumes less than 3 milliamperes in standby mode.

14. A portable electronic device capable of infrared communication, comprising:
a portable electronic device; and
an infrared receiver electrically connected to said portable electronic device, said infrared receiver further comprising:
a first receiver preamplifier;
a second receiver preamplifier, wherein said second receiver preamplifier consumes at least twice as much power in standby mode as said first receiver preamplifier consumes in standby mode;
control logic electrically connected to said first receiver preamplifier and said second receiver preamplifier, said control logic configured to put said second receiver preamplifier in shutdown mode when said first receiver preamplifier is in receive mode.

15. A portable electronic device capable of infrared communication, comprising:
a portable electronic device; and
an infrared receiver electrically connected to said portable electronic device, said infrared receiver further comprising:
a first receiver preamplifier;
a second receiver preamplifier, wherein said second receiver preamplifier can operate at a signaling rate at least double the maximum signaling rate of said receiver preamplifier;
control logic electrically connected to said first receiver preamplifier and said second receiver preamplifier, said control logic configured to put said second receiver preamplifier in shutdown mode when said first receiver preamplifier is in receive mode.

16. A method of reducing power consumption in an infrared transceiver, comprising the steps of:
operating a first receiver preamplifier in stand by mode;
operating a second receiver preamplifier in shutdown mode;
waking up said second receiver preamplifier and shutting down a first receiver preamplifier when an infrared transmission is received and a high-speed infrared link is negotiated.

17. The method of claim 16, wherein said first receiver preamplifier is a low-power consumption receiver preamplifier.

18. A method of reducing power consumption in an infrared transceiver, comprising the steps of:
operating a first receiver preamplifier in standby mode;
operating a second receiver preamplifier in shutdown mode; wherein said second receiver preamplifier consumes at least twice as much power in standby mode as said first receiver preamplifier consumes in standby mode.

19. A method of establishing a high-speed infrared link, comprising the steps of:
operating a first infrared transceiver with a low-speed receiver preamplifier in standby mode and a higher-speed receiver preamplifier in shutdown mode;
detecting an infrared transmission from a second infrared transceiver;
operating said fist infrared transceiver with said low-speed receiver preamplifier in receive mode;
negotiating a link speed between said first and second transceivers;
waking said higher-speed receiver preamplifier;
placing said low-speed receiver in a passive mode; and
operating said first transceiver with said higher-speed receiver preamplifier in receive mode.

20. The method of claim 19, wherein said higher-speed receiver preamplifier can operate at a signaling rate a least double the maximum signaling rate of said low-speed receiver preamplifier.

21. A method of operating an infrared receiver, comprising the steps of:
operating a low-speed receiver preamplifier in standby mode;

operating a higher-speed receiver preamplifier in shutdown mode;

receiving an infrared transmission; and waking said higher-speed receiver preamplifier.

22. A method of operating an infrared receiver, comprising the steps of:

operating a low power-consumption receiver preamplifier in standby node;

operating a higher power-consumption receiver preamplifier in shutdown mode;

receiving an infrared transmission; and waking said higher power consumption receiver preamplifier.

23. The method of claim 22, further comprising, between said receiving step and said waking up step, the step of:

negotiating a high-speed infrared link;

wherein said high-speed infrared link operates at signal rates greater than 200 kbps.

24. The method of claim 22, wherein said low power consumption receiver preamplifier consumes less than 3 milliamperes in standby mode.

* * * * *